(12) United States Patent
Long et al.

(10) Patent No.: US 11,530,857 B2
(45) Date of Patent: Dec. 20, 2022

(54) AIR CONDITIONING REHEAT SYSTEMS AND METHODS THERETO

(71) Applicant: Rheem Manufacturing Company, Atlanta, GA (US)

(72) Inventors: Robert L. Long, Fort Smith, AR (US); Karl Tallakson, Fort Smith, AR (US); Sivakumar Gopalnarayanan, Plano, TX (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 221 days.

(21) Appl. No.: 17/093,868

(22) Filed: Nov. 10, 2020

(65) Prior Publication Data

US 2022/0146164 A1 May 12, 2022

(51) Int. Cl.
*F25B 49/02* (2006.01)
*F25B 39/00* (2006.01)
(Continued)

(52) U.S. Cl.
CPC .............. *F25B 49/02* (2013.01); *F25B 39/00* (2013.01); *F25B 41/20* (2021.01); *F25B 41/31* (2021.01);
(Continued)

(58) Field of Classification Search
CPC .......... F25B 49/02; F25B 39/00; F25B 41/20; F25B 41/31; F25B 2600/111; F25B 2600/2513; F25B 2700/02; F25B 2700/2104; F25B 2700/2117; F25B 2313/0212; F25B 2700/1933;
(Continued)

(56) References Cited

U.S. PATENT DOCUMENTS

| 3,798,920 A | 3/1974 | Morgan |
| 4,409,796 A * | 10/1983 | Fisher ..................... F24F 11/30 |
| | | 62/238.7 |

(Continued)

FOREIGN PATENT DOCUMENTS

| CN | 101263350 A | 9/2008 |
| EP | 2104810 B1 | 7/2016 |

(Continued)

OTHER PUBLICATIONS

International Search Report and Written Opinion for PCT Application No. PCT/US2021/058386 dated Feb. 17, 2022.

*Primary Examiner* — Kun Kai Ma
(74) *Attorney, Agent, or Firm* — Eversheds Sutherland (US) LLP

(57) ABSTRACT

The disclosed technology includes systems and methods for controlling an air conditioning system. The method of controlling the air conditioning system can include receiving air temperature data from an air temperature sensor and determining that the air conditioning system should operate in a reheat mode based on the air temperature being less than a threshold air temperature. The method can include outputting a control signal to a first electronic expansion valve to close and thereby prevent refrigerant to flow through an outdoor condenser coil. The method can also include outputting a control signal to a second electronic expansion valve to open and thereby permit refrigerant to flow through a reheat coil.

20 Claims, 6 Drawing Sheets

(51) Int. Cl.
*F25B 41/20* (2021.01)
*F25B 41/31* (2021.01)

(52) U.S. Cl.
CPC .............. *F25B 2600/111* (2013.01); *F25B 2600/2513* (2013.01); *F25B 2700/02* (2013.01); *F25B 2700/2104* (2013.01); *F25B 2700/2117* (2013.01)

(58) Field of Classification Search
CPC ... F25B 2700/21173; F25B 6/02; F24F 11/84; F24F 2110/10; Y02B 30/70
See application file for complete search history.

(56) References Cited

U.S. PATENT DOCUMENTS

| | | | |
|---|---|---|---|
| 4,493,193 A * | 1/1985 | Fisher | F25B 13/00 62/238.7 |
| 4,553,401 A * | 11/1985 | Fisher | F25B 5/00 62/238.7 |
| 4,944,158 A * | 7/1990 | Akiike | F25D 21/002 62/282 |
| 6,672,087 B1 | 1/2004 | Taras et al. | |
| 6,694,756 B1 | 2/2004 | Taras et al. | |
| 6,701,723 B1 * | 3/2004 | Dobmeier | F24F 11/0008 62/90 |
| 6,705,093 B1 | 3/2004 | Taras et al. | |
| 6,941,770 B1 | 9/2005 | Taras et al. | |
| 6,955,057 B2 | 10/2005 | Taras et al. | |
| 6,986,264 B1 | 1/2006 | Taras et al. | |
| 7,043,930 B2 | 5/2006 | Bussjager | |
| 7,059,151 B2 | 6/2006 | Taras et al. | |
| 7,228,708 B2 | 6/2007 | Taras et al. | |
| 7,231,774 B2 | 6/2007 | Taras et al. | |
| 7,257,957 B2 * | 8/2007 | Lifson | F24F 3/153 62/196.3 |
| 7,275,384 B2 | 10/2007 | Taras et al. | |
| 7,290,399 B2 | 11/2007 | Taras et al. | |
| 7,325,414 B2 | 2/2008 | Taras et al. | |
| 7,469,555 B2 | 12/2008 | Taras et al. | |
| 7,854,140 B2 | 12/2010 | Lifson et al. | |
| 7,921,661 B2 | 4/2011 | Taras et al. | |
| 8,347,643 B2 | 1/2013 | Taras et al. | |
| 8,356,491 B2 | 1/2013 | Taras et al. | |
| 8,397,522 B2 * | 3/2013 | Springer | F24F 11/77 62/93 |
| 8,418,486 B2 | 4/2013 | Taras et al. | |
| 9,103,575 B2 * | 8/2015 | Taras | F24F 3/153 |
| 9,726,387 B2 * | 8/2017 | Karkhanis | F24F 11/83 |
| 2009/0277193 A1 * | 11/2009 | Springer | F24F 11/77 62/93 |
| 2010/0170271 A1 | 7/2010 | Lifson et al. | |
| 2010/0307172 A1 | 12/2010 | Lifson et al. | |
| 2012/0174602 A1 * | 7/2012 | Olivier | F25B 25/005 62/238.1 |
| 2015/0013356 A1 * | 1/2015 | Karkhanis | F24F 11/30 62/90 |
| 2019/0041882 A1 | 2/2019 | Noboa et al. | |
| 2019/0178509 A1 * | 6/2019 | Taras | F25B 13/00 |
| 2019/0338974 A1 | 11/2019 | Turney et al. | |
| 2020/0378630 A1 * | 12/2020 | Kalambe | F25B 49/02 |
| 2022/0146164 A1 * | 5/2022 | Long | F25B 41/31 |

FOREIGN PATENT DOCUMENTS

| | | |
|---|---|---|
| WO | 2014/141724 A2 | 9/2014 |
| WO | 2018/022638 A1 | 2/2018 |

\* cited by examiner

AIR CONDITIONING REHEAT SYSTEMS AND METHODS THERETO

FIELD OF TECHNOLOGY

The present disclosure relates generally to systems and methods for controlling air conditioning systems, and, more specifically, to systems and methods for controlling a reheat cycle of an air conditioning system.

BACKGROUND

Air conditioning systems are commonly used to create a comfortable climate for occupants of a building by providing cool air to the building. To maintain a comfortable climate during periods of high relative humidity, some air conditioning systems operate to cause moisture to condense on the surface of the cool evaporator coil and remove humidity from the building, even when the air temperature in the building is close to or below the set temperature for the air conditioning system. To ensure the conditioned air supplied to the building is not uncomfortably cold, however, some air conditioning systems utilize a reheat mode to re-increase the temperature of the conditioned air back to approximately the same temperature as the air already in the building.

When operating in a reheat mode, many air conditioning systems utilize a reheat coil positioned downstream of the indoor evaporator coil. A portion of the refrigerant in the system is routed to the reheat coil, rather than the outdoor condenser coil, to raise the temperature supplied to the building to approximately the same temperature as the air returning to the air conditioning system. This arrangement allows the air conditioner to remove humidity from the building for longer periods of time because the occupied space is not overcooled, and the compressor load is reduced by rejecting heat to the supply airstream which is typically at a lower temperature than the outdoor air. Furthermore, some systems include an indoor relative humidity sensor that can be used to determine whether the humidity in the building is below a threshold humidity level.

Some air conditioning systems that include a reheat coil control the reheat cycle by installing a three-way solenoid valve upstream of the reheat coil and a thermal expansion valve downstream of the reheat coil. Three-way solenoid valves, however, are typically expensive and noisy, and the addition of a thermal expansion valve downstream of the reheat coil can further increase the overall cost of the air conditioning system. Furthermore, most three-way solenoid valves are unable to be modulated. Because most three-way solenoid valves are unable to be modulated, air conditioning systems having a three-way solenoid valve cannot be modulated between a cooling only mode and a reheat mode, resulting in a less efficient operation of the air conditioning system and less control of the indoor relative humidity.

What is needed, therefore, is a system and method of operating an air conditioning system that can modulate a reheat cycle and utilizes more economical components. These and other problems are addressed by the technology disclosed herein.

SUMMARY

The disclosed technology relates generally to systems and methods for controlling air conditioning systems, and, more specifically, to systems and methods for controlling a reheat cycle of an air conditioning system.

The disclosed technology can include a method of controlling an air conditioning system. The method can include receiving, from an air temperature sensor, temperature data indicative of an air temperature in the air conditioning system and determining that the air conditioning system should operate in a reheat mode based at least in part on the air temperature being less than a threshold air temperature. Alternatively or in addition, the method can include receiving, from an indoor relative humidity sensor, humidity data indicative of an air humidity in the air conditioning system and determining that the air conditioning system should operate in a reheat mode based at least in part on the air humidity being less than a threshold air humidity. In response to determining that the air conditioning system should operate in the reheat mode, the method can include outputting a control signal to a first electronic expansion valve to close the first electronic expansion valve, thereby preventing a refrigerant in the air conditioning system from flowing through an outdoor condenser coil. The method can also include outputting a control signal to a second electronic expansion valve to open the second electronic expansion valve, thereby permitting the refrigerant to flow through a reheat coil.

In response to determining that the air conditioning system should operate in the reheat mode, the method can further include outputting a control signal to an outdoor condenser coil fan to turn off. The method can also include determining that the air conditioning system should operate in a cooling mode based at least in part on the air temperature being greater than or equal to the threshold air temperature. In response to determining that the air conditioning system should operate in a cooling mode, the method can include outputting a control signal to the first electronic expansion valve to open the first electronic expansion valve, thereby permitting the refrigerant in the air conditioning system to flow through the outdoor condenser coil. The method can also include outputting a control signal to the second electronic expansion valve to open the second electronic expansion valve, thereby preventing the refrigerant from flow through the reheat coil and outputting a control signal to an outdoor condenser coil fan to turn on.

The method can further include receiving, from a refrigerant temperature sensor, refrigerant temperature data indicative of a refrigerant temperature of refrigerant in the air conditioning system and determining that the air conditioning system should operate in a modulating reheat mode based at least in part on the air temperature being less than the threshold air temperature and the refrigerant temperature being less than a threshold refrigerant temperature. In response to determining that the air conditioning system should operate in a modulating reheat mode, the method can include outputting a control signal to the first electronic expansion valve to modulate the first electronic expansion valve to control a flow of the refrigerant through the outdoor condenser coil, and outputting a control signal to the second electronic expansion valve to modulate the second electronic expansion valve to control a flow of the refrigerant through the reheat coil.

The temperature data can be indicative of a superheat of refrigerant flowing through an evaporator. The method can include determining that an outdoor condenser coil fan should be operated based at least in part on the refrigerant temperature data indicating that the temperature of the refrigerant is less than the threshold refrigerant temperature. In response to determining that the outdoor condenser coil fan should be operated, the method can include outputting a control signal to operate the outdoor condenser coil fan.

Operating the outdoor condenser coil fan can include determining that a speed of the outdoor condenser coil fan should be modulated based at least in part on a difference between the refrigerant temperature and the threshold refrigerant temperature. In response to determining that a speed of the outdoor condenser coil fan should be modulated, the method can include outputting a control signal to modulate the speed of the outdoor condenser coil fan.

Determining that the air conditioning system should operate in a modulating reheat mode further can also include determining that the first electronic expansion valve should be opened a predetermined amount based at least in part on the air temperature data indicating that the air temperature is less than the threshold air temperature and less than a second threshold air temperature. The threshold air temperature can be greater than the second threshold air temperature. The method can also include determining that the second electronic expansion valve should be modulated based at least in part on the refrigerant temperature.

In response to determining that the first electronic expansion valve should be opened the predetermined amount, the method can include outputting a control signal to the first electronic expansion valve to open the first electronic expansion valve the predetermined amount. In response to determining that the second electronic expansion valve should be modulated, the method can include outputting a control signal to modulate the second electronic expansion valve, wherein the second electronic expansion valve is modulated to maintain the refrigerant temperature based at least in part on the threshold refrigerant temperature.

Determining that the air conditioning system should operate in a modulating reheat mode further can include determining that the second electronic expansion valve should be opened a predetermined amount based at least in part on the air temperature data indicating that the air temperature is less than the threshold air temperature and greater than a second threshold air temperature. The threshold air temperature can be greater than the second threshold air temperature. The method can also include determining that the first electronic expansion valve should be modulated based at least in part on the refrigerant temperature In response to determining that the second electronic expansion valve should be opened the predetermined amount, the method can include outputting a control signal to the second electronic expansion valve to open the second electronic valve the predetermined amount. In response to determining that the first electronic expansion valve should be modulated, the method can include outputting a control signal to modulate the first electronic expansion valve. The first electronic expansion valve can be modulated to maintain the refrigerant temperature based at least in part on the threshold refrigerant temperature.

The method can also include receiving, from a humidity sensor, humidity data indicative of a humidity level of air in the air conditioning system and determining that the air conditioning system should operate in a reheat mode based at least in part on the humidity level being greater than a threshold humidity level.

The disclosed technology can also include a non-transitory, computer-readable medium having instructions stored thereon that, when executed by one or more processors, cause a controller to receive, from an air temperature sensor, temperature data indicative of an air temperature in an air conditioning system and determine that the air conditioning system should operate in a reheat mode based at least in part on the air temperature being less than a threshold air temperature. The instructions can also cause the controller to output a control signal to a first electronic expansion valve to close the first electronic expansion valve, thereby preventing a refrigerant in the air conditioning system to flow through an outdoor condenser coil, and output a control signal to a second electronic expansion valve to open the second electronic expansion valve, thereby permitting the refrigerant to flow through a reheat coil.

The instructions, when executed by the one or more processors, can further cause the controller to output a control signal to an outdoor condenser coil fan to turn off. The instructions, when executed by the one or more processors, can also cause the controller to determine that the air conditioning system should operate in a cooling mode based at least in part on the air temperature being greater than or equal to the threshold air temperature. The instructions can also cause the controller to output a control signal to the first electronic expansion valve to open the first electronic expansion valve, thereby permitting a refrigerant in the air conditioning system to flow through the outdoor condenser coil, output a control signal to the second electronic expansion valve to close the second electronic expansion valve, thereby preventing the refrigerant from flowing through the reheat coil, and output a control signal to the outdoor condenser coil fan to turn on.

The instructions can also cause the controller to receive, from a refrigerant temperature sensor, refrigerant temperature data indicative of a refrigerant temperature of refrigerant in the air conditioning system. Additionally, the instructions can also cause the controller to, determine that the air conditioning system should operate in a modulating reheat mode based at least in part on the air temperature being less than the threshold air temperature and the refrigerant temperature being less than a threshold refrigerant temperature, output a control signal to the first electronic expansion valve to modulate the first electronic expansion valve to control a flow of the refrigerant through the outdoor condenser coil, and output a control signal to the second electronic expansion valve to modulate the second electronic expansion valve to control a flow of the refrigerant through the reheat coil.

The temperature data can be indicative of an evaporator superheat. To determine that the air conditioning system should operate in a modulating reheat mode, the instructions, when executed by the one or more processors, can cause the controller determine that the first electronic expansion valve should be opened to less than 50% capacity based at least in part on the air temperature data indicating that the air temperature is less than the threshold air temperature and less than a second threshold air temperature, the threshold air temperature being greater than the second threshold air temperature. The instructions can also cause the controller to determine that the second electronic expansion valve should be modulated based at least in part on the refrigerant temperature, output a control signal to the first electronic expansion valve to open the first electronic valve to less than 50% capacity, and output a control signal to modulate the second electronic expansion valve, wherein the second electronic expansion valve is modulated to maintain the refrigerant temperature based at least in part on the threshold refrigerant temperature.

To determine that the air conditioning system should operate in a modulating reheat mode, the instructions, when executed by the one or more processors, can cause the controller to determine that the second electronic expansion valve should be opened less than 50% capacity based at least in part on the air temperature data indicating that the air temperature is less than the threshold air temperature and greater than a second threshold air temperature, the threshold air temperature being greater than the second threshold air temperature. The instructions can also cause the controller to determine that the first electronic expansion valve should be modulated based at least in part on the refrigerant temperature, output a control signal to the second electronic expansion valve to open the second electronic valve less than 50% capacity, and output a control signal to modulate the first electronic expansion valve, wherein the first electronic expansion valve is modulated to maintain the refrigerant temperature based at least in part on the threshold refrigerant temperature.

The instructions can also cause the controller to determine that the outdoor condenser coil fan should be operated based at least in part on the refrigerant temperature data indicating that the temperature of the refrigerant is less than the threshold refrigerant temperature and output a control signal to operate the outdoor condenser coil fan.

To output a control signal to operate the outdoor condenser coil fan, the instructions, when executed by the one or more processors, can cause the controller to determine a speed of the outdoor condenser coil fan should be modulated based at least in part on a difference between the refrigerant temperature and the threshold refrigerant temperature and output a control signal to modulate the speed of the outdoor condenser coil fan.

The instructions can also cause the controller to receive, from a humidity sensor, humidity data indicative of a humidity level of air in the air conditioning system and determine that the air conditioning system should operate in a reheat mode based at least in part on the humidity level being greater than a threshold humidity level.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
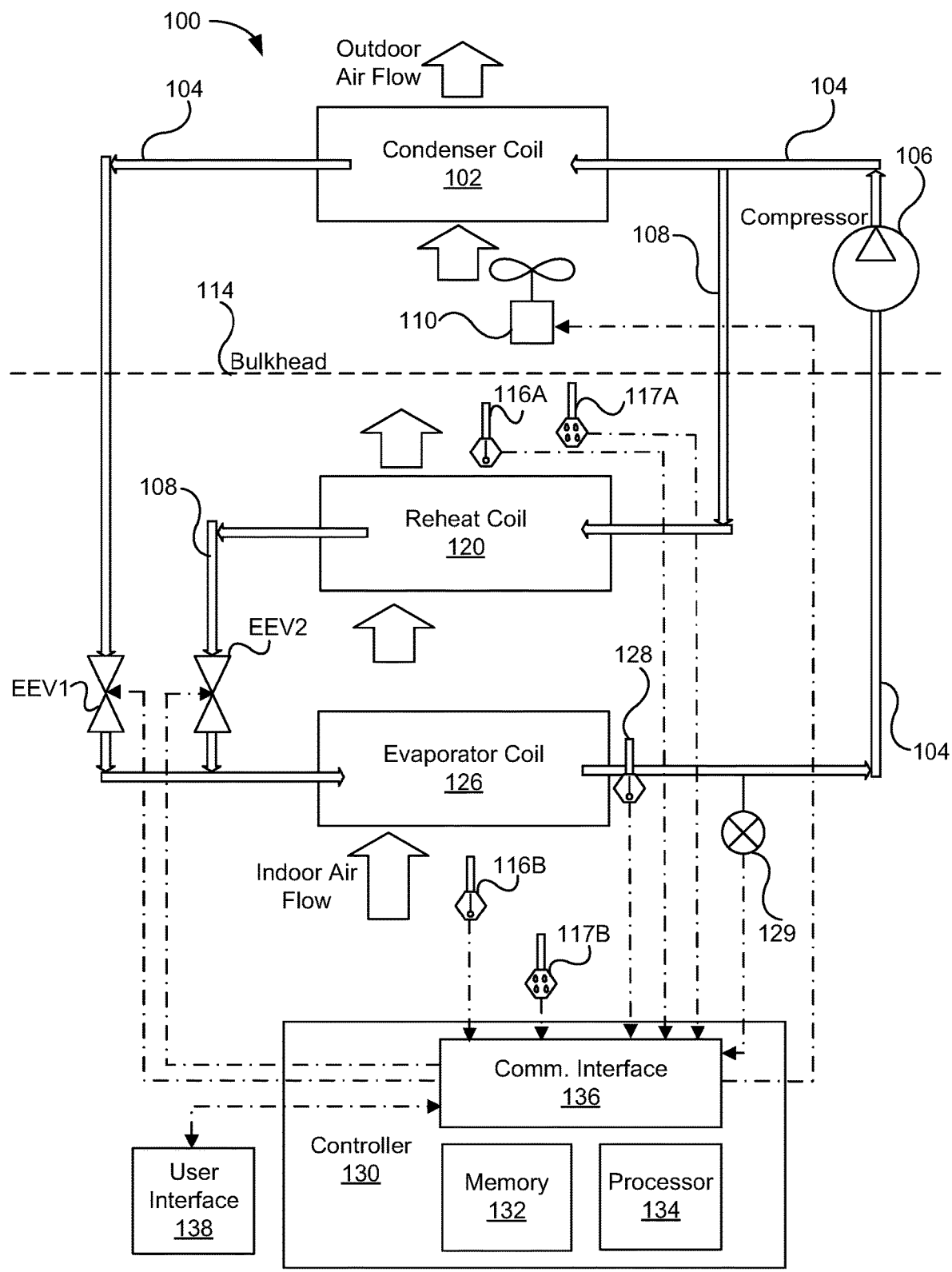
FIG. 1 illustrates an example air conditioning system having a reheat system, in accordance with the disclosed technology.

The disclosed technology relates generally to systems and methods for controlling a reheat cycle of an air conditioning system. The air conditioning system can include two or more electronic expansion valves controlled by a controller to direct an amount of refrigerant through a reheat coil. The reheat coil can be positioned in an air duct downstream of the indoor evaporator coil such that the reheat coil can add heat to the air directed over the evaporator coil prior to the air returning to the building. The controller can be configured to modulate one or more electronic expansion valves to ensure the reheat coil sufficiently heats the air supplied to the building. The controller can also modulate one or more electronic expansion valves to maintain a superheat of the refrigerant in the air conditioning system. As will be appreciated by one of skill in the art, superheat of the refrigerant occurs when the refrigerant is heated above its boiling point. Accurately controlling the superheat of the refrigerant can be critical to the operation of the air conditioning system because it protects the compressor from damage that could occur from liquid refrigerant entering the compressor and also ensures the system operates efficiently. Furthermore, by simultaneously controlling the heat output of the reheat coil and the superheat of the air conditioning system, the controller can ensure the air conditioning system more efficiently maintains a comfortable climate within the building. Systems and methods of controlling a reheat cycle of an air conditioning system are more fully described herein.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of being a system and method for controlling a reheat cycle of an air conditioning system. The present disclosure, however, is not so limited, and can be applicable in other contexts. The present disclosure, for example and not limitation, can include other air conditioning or fluid conditioning systems used in industrial or manufacturing applications. For example, the disclosed technology can include heat pump drying systems generally used in drying or preserving seed, grain, textiles, paper, works of art, wood, or any other space and/or object that would optimally be stored in a temperature and humidity-controlled location. Such implementations and applications are contemplated within the scope of the present disclosure. Accordingly, when the present disclosure is described in the context of being a system and method for controlling a reheat cycle of an air conditioning system, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described. FIG. 1 illustrates an air conditioning system 100 having a reheat system, in accordance with the disclosed technology. The air conditioning system 100 can include a condenser coil 102, an evaporator coil 126, and a compressor 106. The condenser coil 102, the evaporator coil 126, and the compressor 106 can each be in fluid communication with each other via one or more refrigerant lines 104 configured to direct refrigerant in the air conditioning system 100. As will be appreciated, the air conditioning system 100 can be configured to provide cool air to a building by removing heat from the building via the evaporator coil 126 and releasing the heat to the ambient air via the condenser coil 102 through a refrigeration cycle.

The condenser coil 102 can be located outside of a building or otherwise in a location where heat contained in the refrigerant can be released to ambient air (e.g., the condenser coil 102 can be located indoors with released heat being vented to an outdoor location). The evaporator coil 126, on the other hand, can be located inside of the building or otherwise in a location where air from the inside of the building can be directed across the evaporator coil 126 and heat can be removed from the air. In other words, the condenser coil 102 and the evaporator coil 126 can be separated by a bulkhead 114 or other partition such that the temperature of the air proximate the condenser coil 102 can be different from the ambient air proximate the evaporator coil 126.

The condenser coil 102 and the evaporator coil 126 can be any kind of heat exchanger coil configured to facilitate heat transfer between a refrigerant and an ambient fluid. Furthermore, the condenser coil 102 and the evaporator coil 126 can be made from any type of material that can effectively exchange heat, including copper, aluminum, stainless steel, gold, silver, gallium, indium, thallium, graphite, composite materials, or any other material that is appropriate for the given application.

To help facilitate heat transfer at the condenser coil 102, the air conditioning system 100 can include a condenser coil fan 110, or similar air moving device, configured to direct ambient air across the condenser coil 102. The condenser coil fan 110 can be configured to simply be turned on and off as necessary, or the condenser coil fan 110 can be configured such that a speed of the condenser coil fan 110 can be modulated between various speeds. As will be described in greater detail herein, the condenser coil fan 110 can be configured to cause more heat transfer at the condenser coil 102 as necessary to control a superheat of the air conditioning system. For example, in air conditioning systems 100 that include a condenser coil fan 110 capable of being modulated, the speed of the condenser coil fan 110 can be modulated to help control heat release at the condenser coil 102 and consequently maintain superheating of the air conditioning system 100.

The compressor 106 can be configured to circulate a refrigerant in the air conditioning system 100 to facilitate heat exchange at the condenser coil 102 and the evaporator coil 126. The compressor 106 can be any type of compressor used in air conditioning systems. For example, the compressor 106 can be a positive displacement compressor, a reciprocating compressor, a rotary screw compressor, a rotary vane compressor, a rolling piston compressor, a scroll compressor, a diaphragm compressor, a dynamic compressor, an axial compressor, or any other type of compressor suitable for the particular application.

The air conditioning system 100 can include a reheat cycle refrigerant line 108 in fluid communication with the refrigerant line 104. The reheat cycle refrigerant line 108 can be configured to direct the refrigerant, from a point downstream of the compressor 106 and upstream of the condenser coil 102, through a reheat coil 120, and back to the refrigerant line 104 upstream of the evaporator coil 126. In this way, the reheat cycle refrigerant line 108 can be configured to direct either all or part of the refrigerant vapor through the reheat coil 120 rather than through the condenser coil 102. As will be appreciated, by directing some refrigerant through the reheat coil 120 rather than through the condenser coil 102, the redirected, heated refrigerant vapor can release heat to the indoor ambient air (e.g. indoor air) proximate the reheat coil 120 to raise the temperature of the ambient air. Furthermore, by positioning the reheat coil 120 downstream of the air flowing over the evaporator coil 126, the cool, dehumidified air directed from the evaporator coil 126 can be heated prior to being delivered to the building. In this way, the air conditioning system 100 can be configured such that the evaporator coil 126 can be at a lower temperature to cause moisture in the air to condense at the evaporator coil 126 and moisture can be removed from the air creating a more enjoyable climate for occupants of the building. Furthermore, the reheat coil 120 can help to ensure the air supplied by the air conditioning system to the building is not uncomfortably cold. Stated otherwise, the evaporator coil 126 can transition passing ambient air into cool, dehumidified air, and the reheat coil 120 can transition the cool, dehumidified air into re-heated (e.g., to room temperature, to a target temperature, etc.), dehumidified air.

To help control the temperature of the air supplied by the air conditioning system 100, the air conditioning system 100 can have one or more temperature sensors 116 (shown in FIG. 1 as two sensors temperature sensors 116A and 116B) configured to detect a temperature of air in the system 100. For example, a temperature sensor 116A can be installed in an air flow path proximate to, or downstream of, the reheat coil 120 and can be configured to detect a temperature of the air downstream of the reheat coil 120. Alternatively or in addition, a temperature sensor 116B can be installed in an air flow path proximate to, or upstream of, the evaporator coil 126 and be configured to detect a temperature of the air upstream of the evaporator coil 120. The temperature sensors 116 can each be configured to output temperature data and be in communication with a controller 130. As will be described in greater detail herein, the temperature data provided by the temperature sensors 116 can be used by the controller 130 to determine actions based on current system conditions. For example, the temperature data from temperature sensors 116 can be used by the controller to determine how to operate the reheat coil 120 such that air supplied from the air conditioning system 100 is maintained within an acceptable temperature range.

Although two temperature sensors 116 are depicted in FIG. 1, the system 100 can include one, two, three, four, five, or more temperature sensors 116, and the number of temperature sensors used can be selected depending on the application or any number of reasons. For example, the system 100 can include only temperature sensor 116A to measure the temperature of the air downstream of the reheat coil 120, or the system 100 can include only temperature sensor 116B to measure the temperature of the air upstream of the evaporator coil 126. Alternatively, the system 100 can include three, four, five, or more temperature sensors 116 installed in various locations throughout the air conditioning system 100. For example, additional temperature sensors can be installed proximate the condenser coil 102, downstream of the evaporator coil 126, in various locations throughout the building, or even outside of the building. As will be appreciated, the number of temperature sensors and the location of the temperature sensors can be varied depending on the particular application.

The air conditioning system 100 can include a refrigerant temperature sensor 128 configured to detect a temperature of the refrigerant in the system 100. For example, and as depicted in FIG. 1, the refrigerant temperature sensor 128 can be located in a refrigerant path downstream of the evaporator coil 126 and be configured to detect a temperature of the refrigerant at that location. The air conditioning system 100 can include refrigerant temperature sensors 128 installed in various locations throughout the air conditioning system 100. For example, the air conditioning system 100 can include a refrigerant temperature sensor 128 located upstream of the evaporator coil 126, downstream of the compressor 106, downstream of the condenser coil 102, downstream of the reheat coil 120, and/or other locations as suitable for the particular application. As will be appreciated, the refrigerant temperature sensor 128 can be configured to output temperature data to the controller 130.

The temperature sensor(s) 116 and/or refrigerant temperature sensor 128 can each be any type of temperature sensor capable of measuring a temperature and providing temperature data indicative of the measured temperature to the controller 130. For example, the temperature sensors 116 and refrigerant temperature sensor 128 can each be thermocouples, resistor temperature detectors, thermistors, infrared sensors, semiconductors, or any other type of sensors as would be appropriate for a given use or application. All temperature sensors of the system 100 can be the same type of temperature sensor, or the system 100 can include different types of temperature sensors. For example, temperature sensor 116A can be a thermistor, while temperature sensor 128 can be a thermocouple. One skilled in the art will appreciate that the type, location, and number of temperature sensors can vary depending on the application.

The air conditioning system 100 can include one or more humidity sensors 117 (shown in FIG. 1 as two humidity sensors 117A and 117B). The humidity sensors 117 can be configured to detect a humidity level (i.e., a moisture content) of ambient air. For example, humidity sensor 118A can be configured to detect a moisture content of the ambient air returning from the building, and humidity sensor 117A can be configured to detect a moisture content of the air being supplied to the building. As will be appreciated, the humidity sensors 117 can be any type of humidity sensor capable of detecting a moisture content of air and supplying the humidity data to the controller 130. For example, the humidity sensors 117 can each be a hygrometer, a capacitive humidity sensor, a resistive humidity sensor, a thermal conductivity humidity sensor, or any other suitable type of humidity sensor for the application. All humidity sensors of the system 100 can be the same type of humidity sensor, or the system 100 can include different types of humidity sensors. For example, humidity sensor 117A can be a thermal conductivity humidity sensor, while humidity sensor 117B can be a resistive humidity sensor. One skilled in the art will appreciate that the type, location, and number of humidity sensors 117 can vary depending on the application.

The air conditioning system 100 can further include a pressure sensor 129 configured to detect a pressure of the refrigerant in the air conditioning system 100. The pressure sensor 129 can be any type of pressure sensor capable of detecting a pressure in the system 100. For example, the pressure sensor 129 can be a capacitive sensor, an inductive pressure sensor, a potentiometric pressure sensor, a piezoelectric sensor, an optical sensor, a Micro Electro-Mechanical (MEMS) sensor, a variable reluctance pressure sensors, a strain gauge pressure sensor, or any other type of pressure sensor capable of measuring a pressure of the refrigerant in the system 100. Furthermore, although only a single pressure sensor 129 is shown in FIG. 1, it will be appreciated that more than one pressure sensor 129 can be included in the system 100. For example, one or more pressure sensors 129 can be installed upstream of the evaporator coil 126, downstream of the compressor, downstream of the condenser coil 102, downstream of the reheat coil 120, and/or upstream or downstream of the electronic expansion valves (EEV1 and EEV2). Furthermore, the pressure sensor 129 can be configured to output pressure data to the controller 130 to help control the air conditioning system 100. If multiple pressure sensors 129 are included, all pressure sensors 129 of the system 100 can be the same type of pressure sensor, or the system 100 can include different types of pressure sensors. For example, a first pressure sensor 129 can be a piezoelectric sensor, while a second pressure sensor 129 can be an inductive pressure sensor. One skilled in the art will appreciate that the type, location, and number of pressure sensors 129 can vary depending on the application.

The air conditioning system 100 can have at least two electronic expansion valves (EEVs) configured to control a flow of the refrigerant through the system 100. A first electronic expansion valve EEV1 can be installed downstream of the condenser coil 102 and upstream of the evaporator coil 126. A second electronic expansion valve EEV2 can be installed downstream of the reheat coil 120 and upstream of the evaporator coil 126. The EEVs can be any type of electronic expansion valve capable of being controlled by the controller 130. For example, the EEVs can be a solenoid (or pulse) electric valve, an analog electric valve, a heat motor valve, or a stepper motor valve or a valve that includes other electromechanical components that can cause the EEVs to open, close, and/or modulate between an open and a closed position. As will be appreciated, the EEVs can be configured to receive a control signal from a controller 130 and change a position of the valve based on the received control signal.

The controller 130 can have a memory 132, a processor 134, and a communication interface 136. The controller 130 can be a computing device configured to receive data, determine actions based on the received data, and output a control signal instructing one or more components of the system 100 to perform one or more actions. One of skill in the art will appreciate that the controller 130 can be installed in any location, provided the controller 130 is in communication with at least some of the components of the system 100. Furthermore, the controller 130 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application. The hard-wired signal can include any directly wired connection between the controller and the other components. For example, the controller 130 can have a hard-wired 24 VDC connection to EEV1 and EEV2. Alternatively, the components can be powered directly from a power source and receive control instructions from the controller 130 via a digital connection. The digital connection can include a connection such as an Ethernet or a serial connection and can utilize any suitable communication protocol for the application such as Modbus, fieldbus, PROFIBUS, Safety-Bus p, Ethernet/IP, or any other suitable communication protocol for the application. Furthermore, the controller 130 can utilize a combination of wireless, hard-wired, and analog or digital communication signals to communicate with and control the various components. One of skill in the art will appreciate that the above configurations are given merely as non-limiting examples and the actual configuration can vary depending on the particular application.

The controller 130 can include a memory 132 that can store a program and/or instructions associated with the functions and methods described herein and can include one or more processors 134 configured to execute the program and/or instructions. The memory 132 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 130 can also have a communication interface 136 for sending and receiving communication signals between the various components. Communication interface 136 can include hardware, firmware, and/or software that allows the processor(s) 134 to communicate with the other components via wired or wireless networks, whether local or wide area, private or public, as known in the art. Communication interface 136 can also provide access to a cellular network, the Internet, a local area network, or another wide-area network as suitable for the particular application.

Additionally, the controller 130 can have or be in communication with a user interface 138 for displaying system information and receiving inputs from a user. The user interface 138 can be installed locally on the system 100 or be a remotely controlled device such as a mobile device. The user, for example, can input data to set one or more temperature thresholds used by the controller 130 to determine actions based on system 100 conditions.

As described previously, controller 130 can be configured to receive inputs from the temperature sensors 116, the humidity sensors 117, the refrigerant temperature sensor 128, and/or the pressure sensor 129 and determine appropriate actions based on the received inputs. For example, the controller 130 can be configured to receive temperature data from the temperature sensor 116A and/or temperature sensor 116B and, based at least in part on the received temperature data, output a control signal to EEV1 and/or EEV2 to cause EEV1 and/or EEV2 to modulate between an open or a closed position. As an example, if the controller determines, based at least in part on the temperature data received from temperature sensor 116A and/or temperature sensor 116B, that the air conditioning system 100 should operate in a reheat mode, the controller 130 can output a control signal to EEV1 to either close completely or close partially and another control signal to EEV2 to either open completely or open partially. In this way, refrigerant flowing through the condenser coil 102 can either be slowed or entirely cease flowing through the condenser coil 102 and begin flowing through the reheat coil 120. As will be appreciated, by circulating the refrigerant through the reheat coil 120, the reheat coil can begin to release heat to the ambient air and cause the air downstream of the evaporator coil 126 to raise in temperature. When the controller 130 determines that EEV1 should be completely closed to cause refrigerant to cease flowing through the condenser coil 102, the controller 130 can also output a control signal to the condenser coil fan 110 to turn off or otherwise cease moving air across the condenser coil 102.

The controller 130 can be further configured to continue to monitor the temperature data received from temperature sensor 116A and/or temperature sensor 116B and determine, based at least in part on the temperature data, that a position of EEV1 and/or EEV2 should be modulated (e.g., actuated to a more closed position or more open position) to ensure the air supplied to the building (e.g., as detected by the temperature sensor 116A) is within an acceptable temperature range of the air returning from the building (e.g., as detected by the temperature sensor 116B). For example, if the controller 130 determines that the temperature of the air supplied to the building should be raised (e.g., as indicated by the temperature data from the temperature sensor 116A indicating that the air temperature downstream of the reheat coil 120 is less than a threshold air temperature), the controller 130 can output a control signal to open EEV2 to a more opened position. The controller 130 can also output a control signal to close EEV1 to a more closed position. By modulating EEV2 to a more opened position and EEV1 to a more closed position, the controller 130 can cause more refrigerant to flow through the reheat coil 120 and consequently add more heat to the air supplied to the building. Similarly, if the controller 130 determines that the temperature of the air supplied to the building should be lowered (e.g., as indicated by the temperature data from the temperature sensor 116A indicating that the air temperature downstream of the reheat coil 120 is greater than a threshold air temperature), the controller 130 can output a control signal to close EEV2 to a more closed position. The controller 130 can also output a control signal to open EEV1 to a more opened position. By modulating EEV2 to a more closed position and EEV1 to a more opened position, the controller 130 can cause less refrigerant to flow through the reheat coil 120 and consequently lessen the amount of heat added the air supplied to the building. By controlling EEV1 and/or EEV2 based on the temperature data from temperature sensor 116A and/or 116B, the controller 130 can be configured to ensure that the temperature of the air supplied to the building remains within a comfortable temperature range (i.e., within a predetermined or user-inputted temperature range) but also that the evaporator coil 126 can be at a temperature where moisture in the air will condense on the evaporator coil 126, reducing the humidity of the air in the building. As will be appreciated, the amount of reheat required by the system 100 can vary depending on the particular conditions. For example, if the evaporator coil 126 must operate at a low temperature to remove humidity from the building, greater reheat may be required to raise the temperature of the air to within an acceptable temperature range. Conversely, if the evaporator coil 126 is not required to operate a low temperature to remove humidity from the building, only a small amount of reheat may be required. Accordingly, the controller can be configured to modulate EEV1 and/or EEV2 to ensure the proper amount of reheat is provided by the system 100. Furthermore, as will be appreciated by one of skill in the art, closing or opening of EEV2 can control the operating pressure and/or operating temperature of the reheat coil 120.

The controller 130 can be further configured to control EEV1 and/or EEV2 to modulate a valve position of EEV1 and/or EEV2 to maintain a superheat of the refrigerant in the system 100. The controller 130 can receive refrigerant temperature data from the refrigerant temperature sensor 128 and/or refrigerant pressure data from pressure sensor 129 and determine, based at least in part on the refrigerant temperature data, that a valve position of EEV1 and/or EEV2 should be modulated. For example, if the controller 130 determines that the superheat is outside of an acceptable superheat temperature range (e.g., above or below the superheat temperature range) or outside of an acceptable super heat pressure range (e.g., above or below the superheat pressure range), the controller 130 can determine that a valve position of EEV1 and/or EEV2 should be modulated.

When the controller 130 determines that EEV1 and/or EEV2 should be modulated to control a superheat of the system 100, the controller 130 can output a control signal to one EEV (e.g., either EEV1 and/or EEV2) to open to a fixed position and output another control signal to modulate the other EEV (e.g., the other of either EEV1 and/or EEV2) to control the superheat of the system 100. For example, if the controller 130 determines that the system 100 should operate in a reheat mode and that a relatively large amount of reheat is required (e.g., greater than 60% reheat is required), the controller 130 can output a control signal to close or partially close EEV1 and open or partially open EEV2 to cause refrigerant to flow through the reheat coil 120. The controller 130 can then receive temperature data from the refrigerant temperature sensor 128 and/or refrigerant pressure data from pressure sensor 129 to determine whether a superheat of the refrigerant in the system 100 is within an acceptable temperature and/or an acceptable pressure range. If the superheat of the refrigerant is outside of the acceptable temperature range and/or the acceptable pressure range, the controller 130 can output a control signal to open or close EEV2 an appropriate amount to ensure the superheat is maintained within the acceptable temperature range and/or the acceptable pressure range. On the other hand, if the controller 130 determines that the system 100 should operate in a reheat mode and that a relatively small amount of reheat is required (e.g., less than 60% reheat is required), the controller 130 can output a control signal to partially close EEV2 and open or partially open EEV1. The controller 130 can receive temperature data from the refrigerant temperature sensor 128 and/or refrigerant pressure data from pressure sensor 129 to determine whether a super heat of the refrigerant in the system 100 is within an acceptable temperature range and/or the acceptable pressure range. If the superheat of the refrigerant is outside of the acceptable temperature range and/or the acceptable pressure range, the controller 130 can output a control signal to open or close EEV1 an appropriate amount to ensure the superheat is maintained within the acceptable temperature range and/or the acceptable pressure range. In this way, both EEV1 and/or EEV2 can be used to control the reheat and the superheat of the system 100.

Alternatively or in addition, EEV2 can remain in a current opened position, and the condenser coil fan 110 can be controlled to maintain an appropriate amount of reheat for the system 100. For example, the controller 130 can determine that additional heat should be rejected at the condenser coil 102 and that the condenser coil fan 110 should be turned on for the condenser coil 102 to begin releasing further heat to the ambient air (e.g., outdoor air). As will be appreciated, by releasing further heat with the condenser coil 102, the amount of heat that will be rejected by the reheat coil 120 to the indoor air will be limited because the amount of heat available from the refrigerant to the reheat coil 120 is also limited. In systems where the speed of the condenser coil fan 110 can be modulated, the controller can output a control signal to modulate a speed of the condenser coil fan 110 to ensure the reheat mode of the system 100 maintains the temperature of the air supplied to the building within an acceptable temperature range.

The controller 130 can also be configured to control a position of EEV1 and/or EEV2 based on humidity data received from humidity sensor 117A and/or humidity sensor 117B. For example, the controller 130 can be configured to receive humidity data from the humidity sensor 117A and/or humidity sensor 117B and, based at least in part on the received humidity data, output a control signal to EEV1 and/or EEV2 to cause EEV1 and/or EEV2 to modulate between an open or a closed position. As an example, if the controller 130 determines, based at least in part on the humidity data received from humidity sensor 117A and/or 117B, that air conditioning system 100 should operate in a reheat mode, the controller 130 can output a control signal to EEV1 to either close completely or close partially and another control signal to EEV2 to either open completely or open partially. In this way, refrigerant flowing through the condenser coil 102 can either be slowed or entirely cease flowing through the condenser coil 102 and begin flowing through the reheat coil 120. As will be appreciated, by circulating the refrigerant through the reheat coil 120, the reheat coil can begin to release heat to the ambient air and cause the air downstream of the evaporator coil 126 to raise in temperature.

The controller 130 can be further configured to continue to monitor the humidity data received from humidity sensor 117A and/or humidity sensor 117B and determine, based at least in part on the humidity data, that a position of EEV1 and/or EEV2 should be modulated to ensure the air supplied to the building (e.g., as detected by humidity sensor 117A) has less moisture content than the air returning to the air conditioning system 100 from the building (e.g., as detected by humidity sensor 117B). As will be appreciated, the amount of reheat required by the system 100 can vary depending on the particular conditions. For example, if relative humidity in the building (e.g., as detected by humidity sensor 117A) is high, the evaporator coil 126 must operate at a low temperature to remove humidity from the building and greater reheat may be required to raise the temperature of the air to within an acceptable temperature range. Conversely, if the evaporator coil 126 is not required to operate at a low temperature to remove humidity from the building, only a small amount of reheat may be required. Accordingly, the controller can be configured to modulate EEV1 and/or EEV2 to ensure the proper amount of reheat is provided by the system 100 based on data received from humidity sensor 117A and/or humidity sensor 117B.

Figure 2:
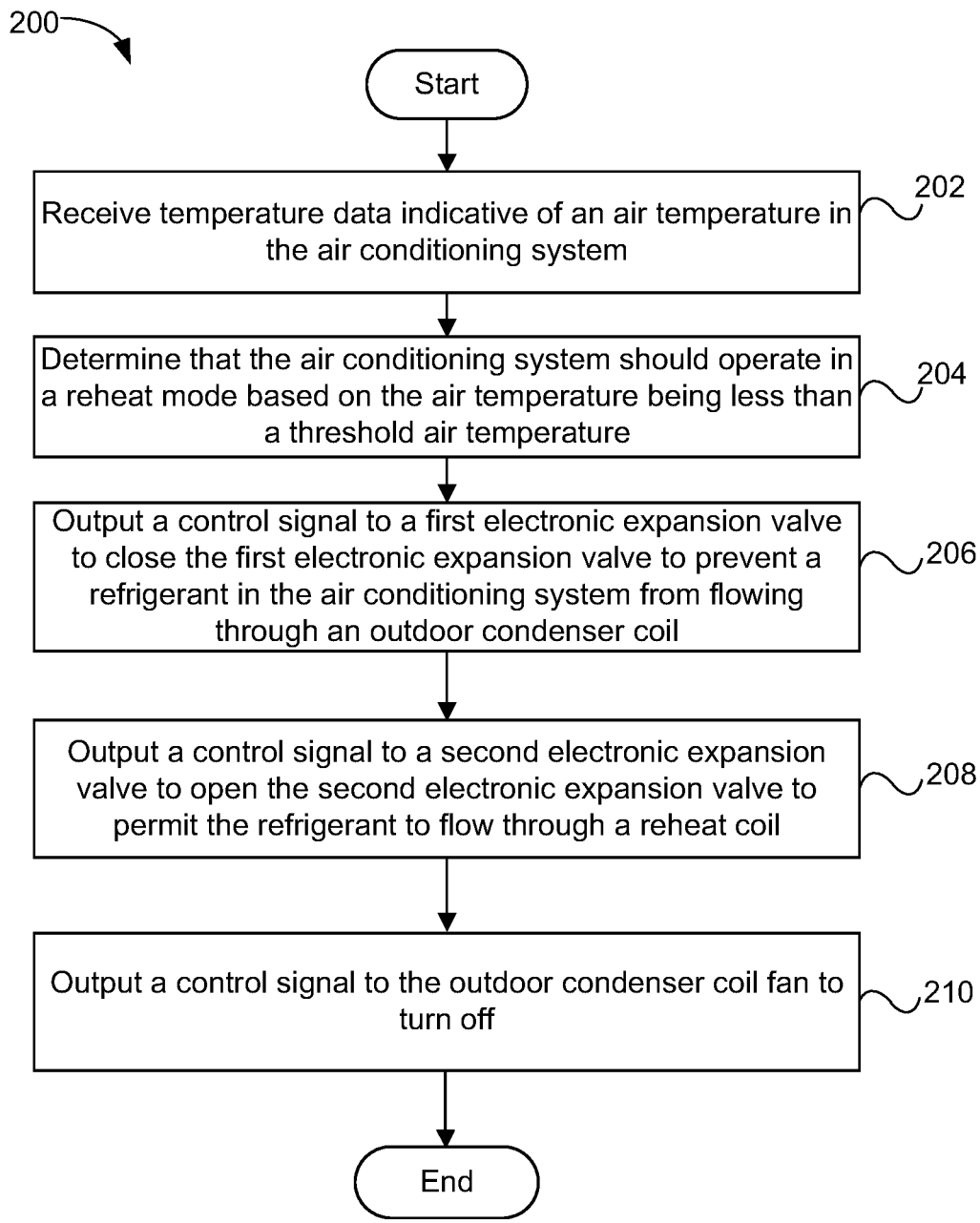
FIG. 2 is a flowchart illustrating an example method of controlling a reheat cycle of an air conditioning system, in accordance with the disclosed technology.

FIG. 2 is a flowchart illustrating an example method 200 of controlling a reheat cycle of an air conditioning system (e.g., air conditioning system 100), in accordance with the disclosed technology, and the method 200 can cause the air conditioning system to transition from a full cooling mode to a full reheating mode. The method 200 can include receiving 202 temperature data (e.g., from an air temperature sensor) indicative of an air temperature in the air conditioning system and determining 204 that the air conditioning system should operate in a reheat mode based at least in part on the air temperature being less than a threshold air temperature (e.g., less than approximately 60° F.). As mentioned previously, the temperature data can correspond to an air temperature upstream of an evaporator coil and/or downstream of a reheat coil. The method 200 can further include, in response to determining that the air conditioning system should operate in reheat mode, outputting 206 a control signal to a first electronic expansion valve to close the first electronic expansion valve to prevent a refrigerant in the air conditioning system from flowing through an outdoor condenser coil and outputting 208 a control signal to a second electronic expansion valve to open the second electronic expansion valve to permit the refrigerant to flow through a reheat coil. Alternatively or additionally, the method 200 can include outputting 210 a control signal to the outdoor condenser coil fan to turn off.

Figure 3:
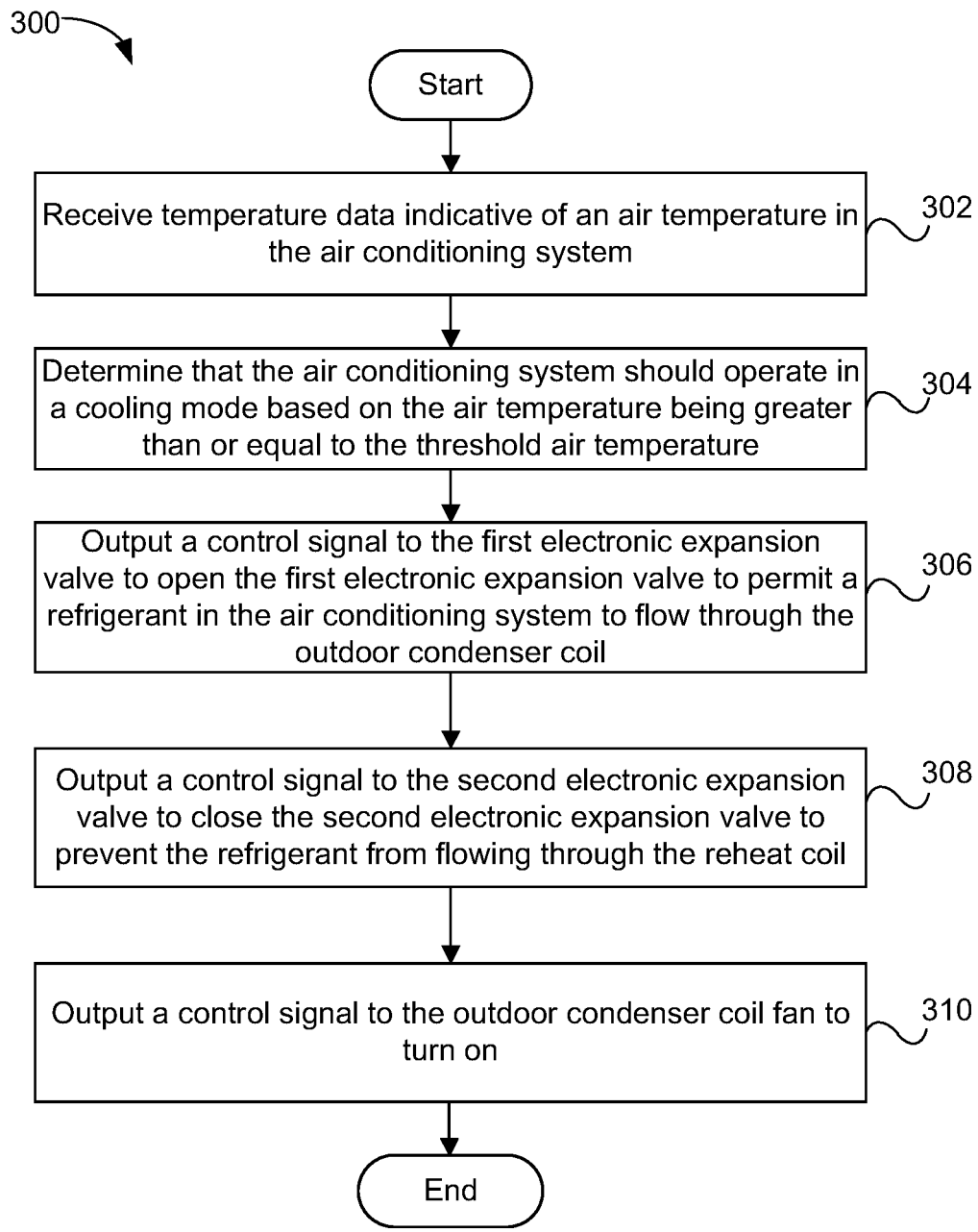
FIG. 3 is a flowchart illustrating an example method of controlling a reheat cycle of an air conditioning system, in accordance with the disclosed technology.

FIG. 3 is a flowchart illustrating an example method 300 of controlling a reheat cycle of an air conditioning system (e.g., air conditioning system 100), in accordance with the disclosed technology, and the method 300 can cause the air conditioning system to transition from the full reheat mode to the full cooling mode. The method 300 can include receiving 302 temperature data (e.g., from an air temperature sensor) indicative of an air temperature in the air conditioning system and determining 304 that the air conditioning system should operate in a cooling mode based at least on the air temperature being greater than or equal to a threshold air temperature. The method 300 can further include outputting 306 a control signal to the first electronic expansion valve to open the first electronic expansion valve to permit a refrigerant in the air conditioning system to flow through the outdoor condenser coil and outputting 308 a control signal to the second electronic expansion valve to close the second electronic expansion valve to prevent the refrigerant from flowing through the reheat coil. Alternatively or in addition, the method 300 can include outputting 310 a control signal to the outdoor condenser coil fan to turn on.

Figure 4:
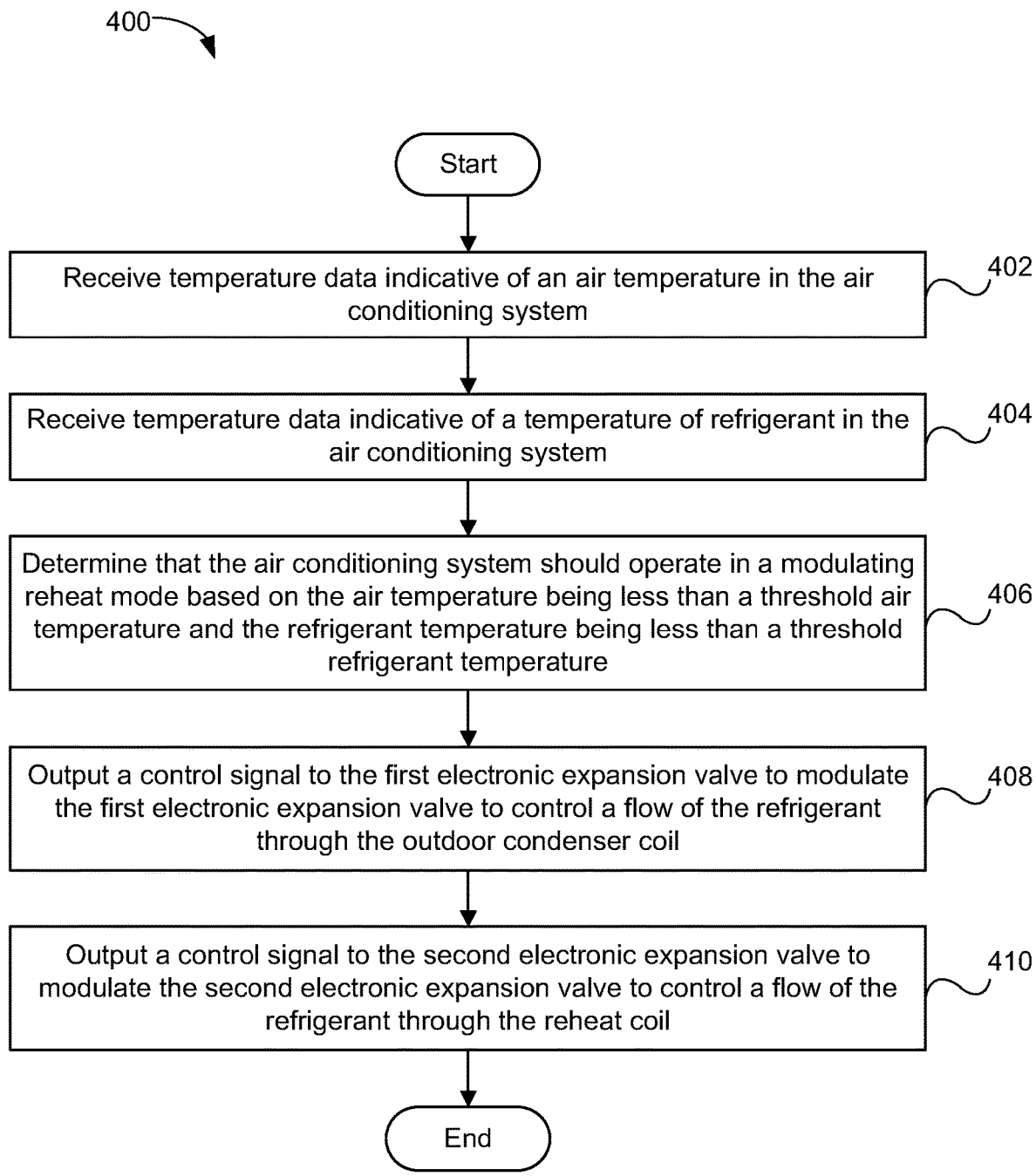
FIG. 4 is a flowchart illustrating an example method of controlling a reheat cycle of an air conditioning system, in accordance with the disclosed technology.

FIG. 4 is a flowchart illustrating an example method 400 of controlling a reheat cycle of an air conditioning system (e.g., air conditioning system 100), in accordance with the disclosed technology. The method 400 can include receiving 402 air temperature data (e.g., from an air temperature sensor) indicative of an air temperature in the air conditioning system and receiving 404 refrigerant temperature data (e.g., from a fluid temperature sensor) indicative of a temperature of refrigerant in the air conditioning system. The method 400 can further include determining 406 that the air conditioning system should operate in a modulating reheat mode based at least on the air temperature being less than a threshold air temperature and the refrigerant temperature being less than a threshold refrigerant temperature. As will be appreciated, the threshold air temperature can be a user-inputted temperature and/or correspond to a predetermined temperature below which an occupant of a building is likely to be uncomfortable. In this way, the method 400 can be used to ensure air supplied to the building remains within a comfortable temperature range for the occupants. The method 400 can include outputting 408 a control signal to the first electronic expansion valve to modulate the first electronic expansion valve to control a flow of the refrigerant through the outdoor condenser coil. The method 400 can further include outputting 410 a control signal to the second electronic expansion valve to modulate the second electronic expansion valve to control a flow of the refrigerant through the reheat coil.

As will be appreciated, by controlling the flow of the refrigerant through the condenser coil and the reheat coil, the method 400 can control the reheat of air being delivered to a building to ensure the temperature of the air remains at a comfortable level. For example, in response to determining that the temperature of the air supplied to the building should be raised (e.g., as indicated by the temperature data from the temperature sensor indicating that the air temperature downstream of the reheat coil is less than a threshold air temperature), the method 400 can include outputting a control signal to modulate the second electronic expansion valve to a more opened position. Additionally, the method 400 can include outputting a control signal to modulate the first electronic expansion valve to a more closed position. By modulating the second electronic expansion valve to a more opened position and first electronic expansion valve to a more closed position, the method 400 can cause more refrigerant to flow through the reheat coil and consequently add more heat to the air supplied to the building. Similarly, the method 400 can include determining that the temperature of the air supplied to the building should be lowered (e.g., as indicated by the temperature data from the temperature sensor indicating that the air temperature downstream of the reheat coil is greater than a threshold air temperature), the method 400 can include outputting a control signal to modulate the second electronic expansion valve to a more closed position. The method 400 can also include outputting a control signal to modulate the first electronic expansion valve to a more opened position. By modulating the second electronic expansion valve to a more closed position and the first electronic expansion valve to a more opened position, the method 400 can cause less refrigerant to flow through the reheat coil and consequently lessen the amount of heat added the air supplied to the building.

Figure 5:
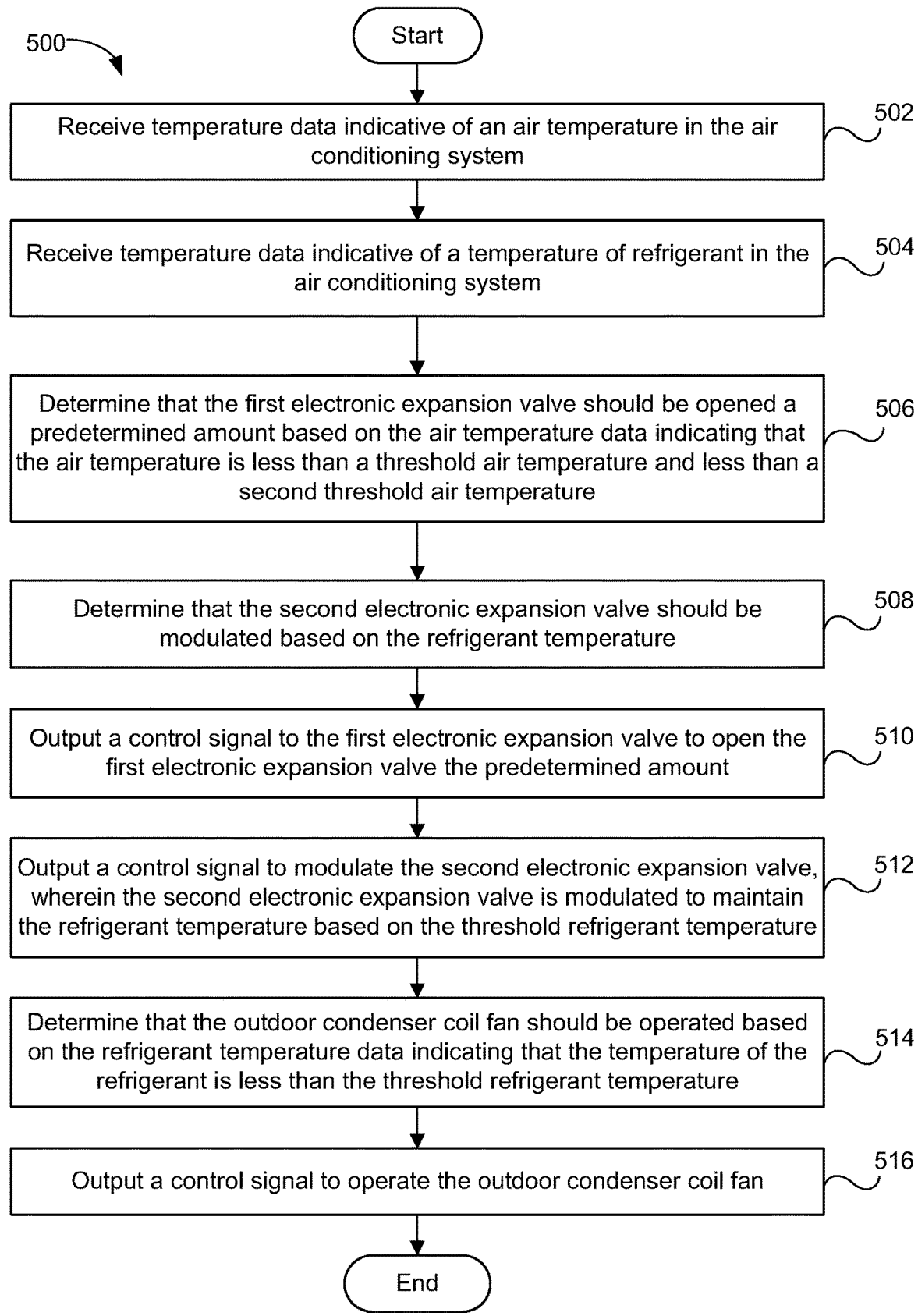
FIG. 5 is a flowchart illustrating an example method of controlling a reheat cycle of an air conditioning system, in accordance with the disclosed technology.

FIG. 5 is a flowchart illustrating an example method 500 of controlling a reheat cycle of an air conditioning system (e.g., air conditioning system 100), in accordance with the disclosed technology. The method 500 can include receiving 502 air temperature data (e.g., from an air temperature sensor) indicative of an air temperature in the air conditioning system and receiving 504 refrigerant temperature data (e.g., from a fluid temperature sensor) indicative of a refrigerant temperature of refrigerant in the air conditioning system. The method 500 can include determining 506 that the first electronic expansion valve should be opened a predetermined amount (e.g., 10% capacity, 25% capacity, 50% capacity, 75% capacity, or any capacity between fully-opened and fully-closed) based on at least the air temperature data indicating that the air temperature is less than a first threshold air temperature and less than a second threshold air temperature. The first threshold air temperature can be greater than the second threshold air temperature. As an example, the first threshold air temperature can be a threshold temperature where a controller can determine that reheat is necessary to supply air to the building having a comfortable air temperature. On the other hand, the second threshold air temperature can be a threshold temperature where a controller can determine that the majority of refrigerant should flow through the reheat coil rather than through the condenser coil to provide additional reheat to the air supplied to the building. In this way, the controller can determine, based on the threshold temperatures, an appropriate amount of reheat that is required for the system.

The method 500 can further include determining 508 that the second electronic expansion valve should be modulated based on at least the refrigerant temperature. The method 500 can include outputting 510 a control signal to the first electronic expansion valve to open the first electronic expansion valve a predetermined amount (e.g., 10% capacity, 25% capacity, 50% capacity, 75% capacity, or any capacity between fully-opened and fully-closed) and outputting 512 a control signal to modulate the second electronic expansion valve. The second electronic expansion valve can be modulated to maintain the refrigerant temperature based on the threshold refrigerant temperature. For example, if the refrigerant temperature is greater than an acceptable threshold refrigerant temperature, the second electronic expansion valve can be modulated to a more opened position to allow more refrigerant from the reheat coil to pass through the evaporator coil to maintain a suitable superheat of the refrigerant at the evaporator coil. Alternatively, if the refrigerant temperature is less than an acceptable threshold refrigerant temperature, the second electronic expansion valve can be modulated to a more closed position to allow less refrigerant from the reheat coil to pass through the evaporator coil to maintain a suitable superheat of the refrigerant at the evaporator coil. As will be appreciated, the refrigerant temperature can be indicative of the superheat of the refrigerant in the air conditioning system and the second electronic valve can be modulated to ensure the superheat is maintained within an acceptable range.

The method 500 can also include determining 516 that the outdoor condenser coil fan should be operated based on the refrigerant temperature data indicating that the temperature of the refrigerant is less than the threshold refrigerant temperature and outputting 516 a control signal to operate the outdoor condenser coil fan. Operating the outdoor condenser coil fan can include simply turning on the outdoor condenser coil fan or modulating a speed of the outdoor condenser coil fan.

Figure 6:
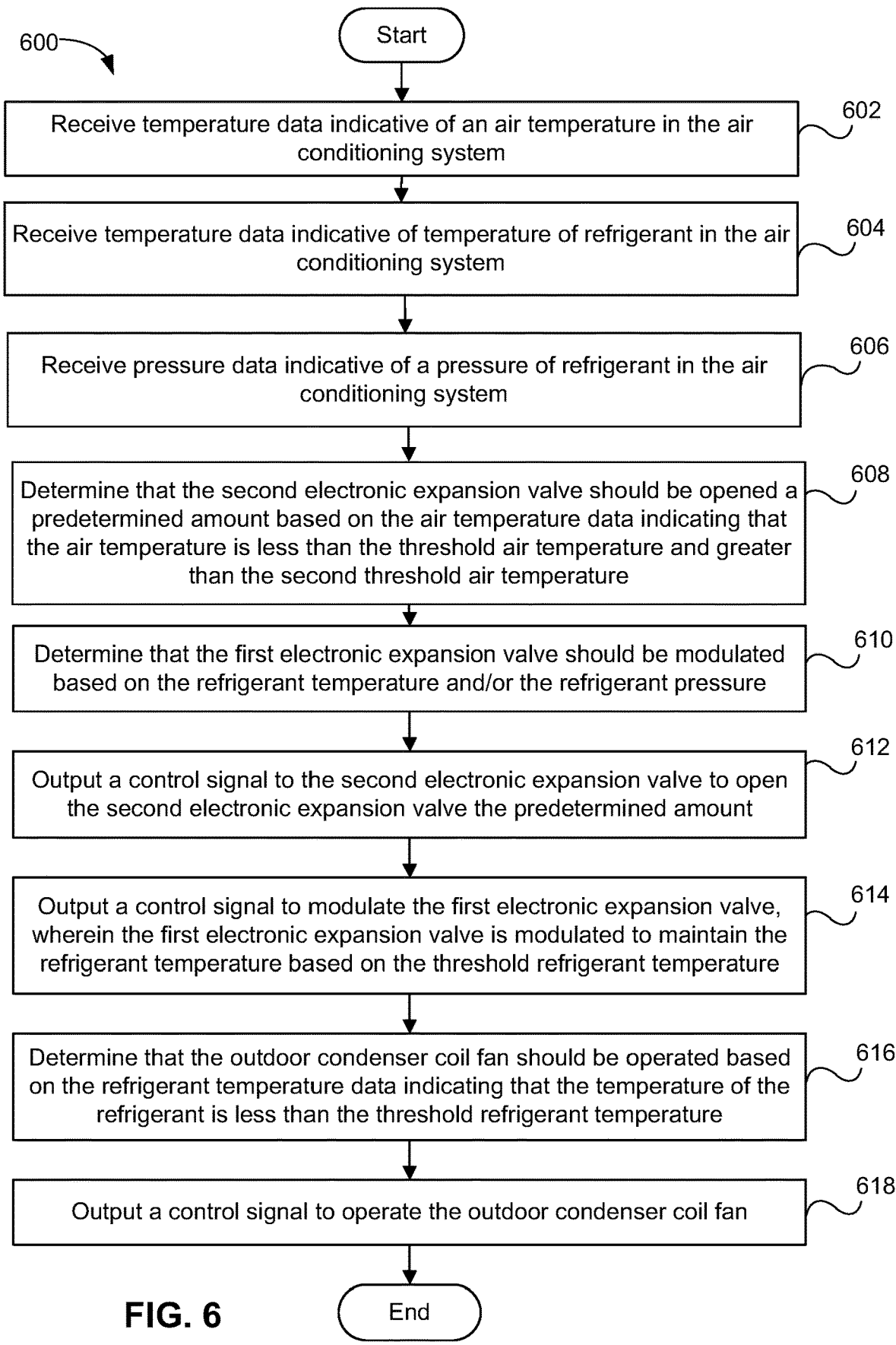
FIG. 6 is a flowchart illustrating an example method of controlling a reheat cycle of an air conditioning system, in accordance with the disclosed technology.

FIG. 6 is a flowchart illustrating an example method 600 of controlling a reheat cycle of an air conditioning system (e.g., air conditioning system 100), in accordance with the disclosed technology. The method 600 can include receiving 602 temperature data (e.g., from an air temperature sensor) indicative of an air temperature in the air conditioning system and receiving 604 temperature data (e.g., from a refrigerant temperature sensor) indicative of a refrigerant temperature of refrigerant in the air conditioning system. The method 600 can include receiving 606 pressure data indicative of a pressure of refrigerant in the air conditioning system (e.g., from a pressure sensor). The method 600 can further include determining 608 that the second electronic expansion valve should be opened a predetermined amount (e.g., 10% capacity, 25% capacity, 50% capacity, 75% capacity, or any capacity between fully-opened and fully-closed) based on the air temperature data indicating that the air temperature is less than the threshold air temperature and greater than the second threshold air temperature, the threshold air temperature being greater than the second threshold air temperature. Similar to the method 500, in this example, the first threshold air temperature can be a threshold temperature where a controller can determine that reheat is necessary to supply air having a comfortable air temperature to the building. On the other hand, the second threshold air temperature can be a threshold temperature where a controller can determine that the majority of refrigerant should flow through the reheat coil rather than through the condenser coil to provide additional reheat to the air supplied to the building. In this way, the controller can determine, based on the threshold temperatures, an appropriate amount of reheat that is required for the system. Furthermore, the first and second threshold temperatures can both be a user inputted value.

The method 600 can further include determining 610 that the first electronic expansion valve should be modulated based on at least the refrigerant temperature and/or the refrigerant pressure. The method 600 can include outputting 612 a control signal to the second electronic expansion valve to open the second electronic expansion valve a predetermined amount (e.g., 10% capacity, 25% capacity, 50% capacity, 75% capacity, or any capacity between fully-opened and fully-closed) and outputting 614 a control signal to modulate the first electronic expansion valve. The first electronic expansion valve can be modulated to maintain the refrigerant temperature and/or pressure based on the threshold refrigerant temperature and/or the threshold refrigerant pressure. For example, while monitoring the refrigerant pressure, if the refrigerant temperature is greater than an acceptable threshold refrigerant temperature, the first electronic expansion valve can be modulated to a more opened position to allow more refrigerant from the condenser to pass through the evaporator coil to maintain a suitable superheat of the refrigerant at the evaporator coil. Alternatively, if the refrigerant temperature is less than an acceptable threshold refrigerant temperature, the first electronic expansion valve can be modulated to a more closed position to allow less refrigerant from the condenser to pass through the evaporator coil to maintain a suitable superheat of the refrigerant at the evaporator coil. As will be appreciated, the refrigerant temperature can be indicative of the superheat of the refrigerant in the air conditioning system and the first electronic valve can be modulated to ensure the superheat is maintained within an acceptable range.

The method 600 can also include determining 616 that the outdoor condenser coil fan should be operated based at least on the refrigerant temperature data indicating that the temperature of the refrigerant is less than the threshold refrigerant temperature and outputting 618 a control signal to operate the outdoor condenser coil fan. Similar to the method 500, operating the outdoor condenser coil fan in this example can include simply turning on the outdoor condenser coil fan or modulating a speed of the outdoor condenser coil fan.

As will be appreciated, the methods 200, 300, 400, 500, and 600 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method (e.g., method 200, etc.) and at least some elements or steps of a second method (e.g., method 300, etc.). Moreover, the methods described herein, or portions thereof, can be embodied in computer instructions (e.g., in a non-transitory, computer readable medium).

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A method of controlling an air conditioning system, the method comprising:
   receiving, from an air temperature sensor, air temperature data indicative of an air temperature in the air conditioning system;
   determining that the air conditioning system should operate in a reheat mode based at least in part on the air temperature being less than a threshold air temperature; and
   in response to determining that the air conditioning system should operate in the reheat mode:
      outputting a control signal to a first electronic expansion valve to close the first electronic expansion valve, thereby preventing a refrigerant in the air conditioning system from flowing through an outdoor condenser coil; and
      outputting a control signal to a second electronic expansion valve to open the second electronic expansion valve, thereby permitting the refrigerant to flow through a reheat coil.

2. The method of claim 1 further comprising:
   in response to determining that the air conditioning system should operate in the reheat mode, outputting a control signal to an outdoor condenser coil fan to turn off.

3. The method of claim 1 further comprising:
   determining that the air conditioning system should operate in a cooling mode based at least in part on the air temperature being greater than or equal to the threshold air temperature; and
   in response to determining that the air conditioning system should operate in a cooling mode:
      outputting a control signal to the first electronic expansion valve to open the first electronic expansion valve, thereby permitting the refrigerant in the air conditioning system to flow through the outdoor condenser coil;
      outputting a control signal to the second electronic expansion valve to open the second electronic expansion valve, thereby preventing the refrigerant from flow through the reheat coil; and
      outputting a control signal to an outdoor condenser coil fan to turn on.

4. The method of claim 1 further comprising:
   receiving, from a refrigerant temperature sensor, refrigerant temperature data indicative of a refrigerant temperature of refrigerant in the air conditioning system;
   determining that the air conditioning system should operate in a modulating reheat mode based at least in part on the air temperature being less than the threshold air temperature and the refrigerant temperature being less than a threshold refrigerant temperature; and
   in response to determining that the air conditioning system should operate in a modulating reheat mode:
      outputting a control signal to the first electronic expansion valve to modulate the first electronic expansion valve to control a flow of the refrigerant through the outdoor condenser coil; and
      outputting a control signal to the second electronic expansion valve to modulate the second electronic expansion valve to control a flow of the refrigerant through the reheat coil.

5. The method of claim 4, wherein the refrigerant temperature data is indicative of superheated refrigerant flowing through an evaporator.

6. The method of claim 4 further comprising:
   determining that an outdoor condenser coil fan should be operated based at least in part on the refrigerant temperature data indicating that the temperature of the refrigerant is less than the threshold refrigerant temperature; and
   in response to determining that the outdoor condenser coil fan should be operated, outputting a control signal to operate the outdoor condenser coil fan.

7. The method of claim 6, wherein operating the outdoor condenser coil fan comprises:
   determining that a speed of the outdoor condenser coil fan should be modulated based at least in part on a difference between the refrigerant temperature and the threshold refrigerant temperature; and
   in response to determining that a speed of the outdoor condenser coil fan should be modulated, outputting a control signal to modulate the speed of the outdoor condenser coil fan.

8. The method of claim 4, wherein determining that the air conditioning system should operate in a modulating reheat mode further comprises:

determining that the first electronic expansion valve should be opened a predetermined amount based at least in part on the air temperature data indicating that the air temperature is less than the threshold air temperature and less than a second threshold air temperature, the threshold air temperature being greater than the second threshold air temperature;

determining that the second electronic expansion valve should be modulated based at least in part on the refrigerant temperature;

in response to determining that the first electronic expansion valve should be opened the predetermined amount, outputting a control signal to the first electronic expansion valve to open the first electronic expansion valve the predetermined amount; and in response to determining that the second electronic expansion valve should be modulated, outputting a control signal to modulate the second electronic expansion valve, wherein the second electronic expansion valve is modulated to maintain the refrigerant temperature based at least in part on the threshold refrigerant temperature.

9. The method of claim 4, wherein determining that the air conditioning system should operate in a modulating reheat mode further comprises:

determining that the second electronic expansion valve should be opened a predetermined amount based at least in part on the air temperature data indicating that the air temperature is less than the threshold air temperature and greater than a second threshold air temperature, the threshold air temperature being greater than the second threshold air temperature;

determining that the first electronic expansion valve should be modulated based at least in part on the refrigerant temperature;

in response to determining that the second electronic expansion valve should be opened the predetermined amount, outputting a control signal to the second electronic expansion valve to open the second electronic expansion valve the predetermined amount; and in response to determining that the first electronic expansion valve should be modulated, outputting a control signal to modulate the first electronic expansion valve, wherein the first electronic expansion valve is modulated to maintain the refrigerant temperature based at least in part on the threshold refrigerant temperature.

10. The method of claim 1 further comprising:

receiving, from a humidity sensor, humidity data indicative of a humidity level of air in the air conditioning system; and determining that the air conditioning system should operate in a reheat mode based at least in part on the humidity level being greater than a threshold humidity level.

11. A non-transitory, computer-readable medium having instructions stored thereon that, when executed by one or more processors, cause a controller to:

receive, from an air temperature sensor, air temperature data indicative of an air temperature in an air conditioning system;

determine that the air conditioning system should operate in a reheat mode based at least in part on the air temperature being less than a threshold air temperature;

output a control signal to a first electronic expansion valve to close the first electronic expansion valve, thereby preventing a refrigerant in the air conditioning system to flow through an outdoor condenser coil; and output a control signal to a second electronic expansion valve to open the second electronic expansion valve, thereby permitting the refrigerant to flow through a reheat coil.

12. The non-transitory, computer-readable medium of claim 11, wherein the instructions, when executed by the one or more processors, further cause the controller to:

output a control signal to an outdoor condenser coil fan to turn off.

13. The non-transitory, computer-readable medium of claim 11, wherein the instructions, when executed by the one or more processors, further cause the controller to:

determine that the air conditioning system should operate in a cooling mode based at least in part on the air temperature being greater than or equal to the threshold air temperature;

output a control signal to the first electronic expansion valve to open the first electronic expansion valve, thereby permitting a refrigerant in the air conditioning system to flow through the outdoor condenser coil;

output a control signal to the second electronic expansion valve to close the second electronic expansion valve, thereby preventing the refrigerant from flowing through the reheat coil; and output a control signal to the outdoor condenser coil fan to turn on.

14. The non-transitory, computer-readable medium of claim 11, wherein the instructions, when executed by the one or more processors, further cause the controller to:

receive, from a refrigerant temperature sensor, refrigerant temperature data indicative of a refrigerant temperature of refrigerant in the air conditioning system;

determine that the air conditioning system should operate in a modulating reheat mode based at least in part on the air temperature being less than the threshold air temperature and the refrigerant temperature being less than a threshold refrigerant temperature; and output a control signal to the first electronic expansion valve to modulate the first electronic expansion valve to control a flow of the refrigerant through the outdoor condenser coil; and output a control signal to the second electronic expansion valve to modulate the second electronic expansion valve to control a flow of the refrigerant through the reheat coil.

15. The non-transitory, computer-readable medium of claim 14, wherein the refrigerant temperature data is indicative of an evaporator superheat.

16. The non-transitory, computer-readable medium of claim 14, wherein to determine that the air conditioning system should operate in a modulating reheat mode, the instructions, when executed by the one or more processors, further cause the controller to:

determine that the first electronic expansion valve should be opened to less than 50% capacity based at least in part on the air temperature data indicating that the air temperature is less than the threshold air temperature and less than a second threshold air temperature, the threshold air temperature being greater than the second threshold air temperature;

determine that the second electronic expansion valve should be modulated based at least in part on the refrigerant temperature;

output a control signal to the first electronic expansion valve to open the first electronic expansion valve to less than 50% capacity; and output a control signal to modulate the second electronic expansion valve, wherein the second electronic expansion valve is modulated to maintain the refrigerant temperature based at least in part on the threshold refrigerant temperature.

17. The non-transitory, computer-readable medium of claim 14, wherein to determine that the air conditioning system should operate in a modulating reheat mode, the instructions, when executed by the one or more processors, further cause the controller to:

determine that the second electronic expansion valve should be opened less than 50% capacity based at least in part on the air temperature data indicating that the air temperature is less than the threshold air temperature and greater than a second threshold air temperature, the threshold air temperature being greater than the second threshold air temperature;

determine that the first electronic expansion valve should be modulated based at least in part on the refrigerant temperature;

output a control signal to the second electronic expansion valve to open the second electronic expansion valve less than 50% capacity; and output a control signal to modulate the first electronic expansion valve, wherein the first electronic expansion valve is modulated to maintain the refrigerant temperature based at least in part on the threshold refrigerant temperature.

18. The non-transitory, computer-readable medium of claim 14, wherein the instructions, when executed by the one or more processors, further cause the controller to:

determine that the outdoor condenser coil fan should be operated based at least in part on the refrigerant temperature data indicating that the temperature of the refrigerant is less than the threshold refrigerant temperature; and output a control signal to operate the outdoor condenser coil fan.

19. The non-transitory, computer-readable medium of claim 18, wherein to output a control signal to operate the outdoor condenser coil fan, the instructions, when executed by the one or more processors, further cause the controller to:

determine a speed of the outdoor condenser coil fan should be modulated based at least in part on a difference between the refrigerant temperature and the threshold refrigerant temperature; and output a control signal to modulate the speed of the outdoor condenser coil fan.

20. The non-transitory, computer-readable medium of claim 11, wherein the instructions, when executed by the one or more processors, further cause the controller to:

receive, from a humidity sensor, humidity data indicative of a humidity level of air in the air conditioning system; and determine that the air conditioning system should operate in a reheat mode based at least in part on the humidity level being greater than a threshold humidity level.

* * * * *